(12) United States Patent
Fenrich et al.

(10) Patent No.: US 7,903,242 B2
(45) Date of Patent: Mar. 8, 2011

(54) FINGERPRINT IMAGING SYSTEM

(75) Inventors: Richard Karl Fenrich, Blacksburg, VA (US); Lin Li, Salem, OR (US)

(73) Assignee: Identification International, Inc., Blacksburg, VA (US)

( * ) Notice: Subject to any disclaimer, the term of this patent is extended or adjusted under 35 U.S.C. 154(b) by 0 days.

(21) Appl. No.: 12/889,823

(22) Filed: Sep. 24, 2010

(65) Prior Publication Data

US 2011/0013174 A1 Jan. 20, 2011

Related U.S. Application Data

(62) Division of application No. 11/733,080, filed on Apr. 9, 2007, now Pat. No. 7,812,936.

(51) Int. Cl.
*G06K 9/74* (2006.01)
(52) U.S. Cl. .......................................... 356/71; 382/124
(58) Field of Classification Search .................... 356/71; 382/124, 126
See application file for complete search history.

(56) References Cited

U.S. PATENT DOCUMENTS

| | | |
|---|---|---|
| 3,200,701 A | 8/1965 | White |
| 3,679,307 A | 7/1972 | Zoot et al. ............... 356/4 |
| 4,258,994 A | 3/1981 | Task ............................ 354/75 |
| 4,414,684 A | 11/1983 | Blonder ......................... 382/4 |
| 4,933,976 A | 6/1990 | Fishbine et al. ............... 382/4 |
| 5,359,691 A | 10/1994 | Tai et al. .................... 385/146 |
| 5,390,276 A | 2/1995 | Tai et al. .................... 385/146 |
| 5,548,394 A | 8/1996 | Giles et al. .................. 356/71 |
| 5,621,516 A | 4/1997 | Shinzaki et al. ............. 356/71 |
| 5,629,764 A | 5/1997 | Bahuguna et al. ........... 356/71 |
| 5,650,842 A | 7/1997 | Maase et al. ................ 356/71 |
| 5,796,858 A | 8/1998 | Zhou et al. ................. 382/127 |
| 5,854,872 A | 12/1998 | Tai .............................. 385/133 |
| 5,900,993 A | 5/1999 | Betensky ..................... 359/710 |
| 6,061,463 A | 5/2000 | Metz et al. ................ 382/124 |
| 6,069,969 A * | 5/2000 | Keagy et al. ............... 382/124 |
| 6,178,255 B1 | 1/2001 | Scott et al. ................. 382/124 |
| 6,259,108 B1 * | 7/2001 | Antonelli et al. ........... 250/556 |
| 6,355,937 B2 * | 3/2002 | Antonelli et al. ........... 250/556 |
| 6,407,804 B1 | 6/2002 | Hillmann et al. ........... 356/71 |
| 6,429,927 B1 | 8/2002 | Borza .......................... 356/71 |
| 6,628,814 B1 | 9/2003 | Shapiro ..................... 382/127 |
| 6,643,390 B1 | 11/2003 | Clark et al. ................ 382/124 |
| 6,647,133 B1 | 11/2003 | Morita et al. .............. 382/124 |
| 6,665,427 B1 | 12/2003 | Keagy et al. ............... 382/124 |

(Continued)

FOREIGN PATENT DOCUMENTS

EP 1 239 404 A2 9/2002

(Continued)

*Primary Examiner* — Roy Punnoose
(74) *Attorney, Agent, or Firm* — Pillsbury Winthrop Shaw Pittman LLP

(57) ABSTRACT

A fingerprint imaging system configured to capture an image of a friction ridge pattern of a subject (e.g., a fingerprint, a palm print, a hand print, a footprint, etc.). The system may include one or more components that reduce the impact of ambient light on the performance of the system. In some implementations, the system may reduce the impact of ambient light without requiring additional power (e.g., to generate an increased amount of radiation) and without including "external" hoods and/or covers designed to block ambient light prior to the ambient light entering system. Instead, the system may reduce the impact of ambient light on performance by blocking ambient light internally within the system along an optical path of radiation used to electronically capture an image of the friction ridge pattern.

12 Claims, 3 Drawing Sheets

U.S. PATENT DOCUMENTS

| | | | |
|---|---|---|---|
| 6,804,382 B1 | 10/2004 | Dickinson et al. | 382/124 |
| 6,950,196 B2 * | 9/2005 | Fielden et al. | 356/630 |
| 6,970,584 B2 | 11/2005 | O'Gorman et al. | 382/126 |
| 7,009,646 B1 | 3/2006 | Fossum et al. | 348/294 |
| 7,035,444 B2 | 4/2006 | Kunieda et al. | 382/125 |
| 7,050,609 B2 | 5/2006 | Huang | 382/124 |
| 7,130,456 B2 | 10/2006 | Hillmann | 382/127 |
| 7,132,612 B2 | 11/2006 | Lapstun | 178/19.05 |
| 7,812,936 B2 | 10/2010 | Fenrich et al. | 356/71 |
| 7,822,236 B2 | 10/2010 | Fenrich et al. | 382/124 |
| 2001/0050765 A1 * | 12/2001 | Antonelli et al. | 356/71 |
| 2002/0110263 A1 | 8/2002 | Thompson | 382/115 |
| 2002/0124537 A1 | 9/2002 | Manna et al. | 55/385.2 |
| 2002/0126882 A1 | 9/2002 | Funahashi | 382/124 |
| 2003/0016847 A1 | 1/2003 | Quintana | 382/124 |
| 2003/0122958 A1 | 7/2003 | Olita et al. | 348/373 |
| 2004/0041998 A1 | 3/2004 | Haddad | 356/71 |
| 2005/0249390 A1 | 11/2005 | McClurg et al. | 382/127 |
| 2010/0289886 A1 | 11/2010 | Fenrich et al. | 348/77 |

FOREIGN PATENT DOCUMENTS

| | | |
|---|---|---|
| WO | WO 97/43607 | 11/1997 |
| WO | WO 01/01330 | 1/2001 |
| WO | WO 2005/001753 | 1/2005 |

* cited by examiner

FINGERPRINT IMAGING SYSTEM

RELATED APPLICATIONS

This application claims priority from U.S. patent application Ser. No. 11/733,080, filed Apr. 9, 2007, and entitled "FINGERPRINT IMAGING SYSTEM". The aforementioned application is hereby incorporated by reference into the present application in its entirety.

FIELD OF THE INVENTION

The invention relates to the reduction of ambient light within a fingerprint imaging system configured to electronically capture an image of a friction ridge pattern of an individual.

BACKGROUND OF THE INVENTION

Fingerprint imaging systems that electronically capture images of friction ridge patterns of individuals are known. However, the performance of conventional systems may be degraded by ambient light that is introduced to the systems during operation. For example, ambient light may saturate images of the friction ridge in a conventional system. Typically, to address this issue, a fingerprint imaging system may include a relatively high-powered light source to overcome the problem of saturation, and/or external hoods or covers that block ambient light before it enters the system. Each of these solutions is associated with its own drawbacks. For example, a high-powered light source may negatively impact the power budget of the system. External hoods or covers may increase the size and/or weight of the system, and may require additional parts that must be transported in conjunction with the system.

SUMMARY

One aspect of the invention relates to a fingerprint imaging system. The fingerprint imaging system may be configured to capture an image of a friction ridge pattern of a subject (e.g., a fingerprint, a palm print, a hand print, a footprint, etc.). The system may include one or more components that reduce the impact of ambient light on the performance of the system. In some implementations, the system may reduce the impact of ambient light without requiring additional power (e.g., to generate an increased amount of radiation) and without including "external" hoods and/or covers designed to block ambient light prior to the ambient light entering system. Instead, the system may reduce the impact of ambient light on performance by blocking ambient light internally within the system along an optical path of radiation used to electronically capture an image of the friction ridge pattern.

In some embodiments, the system includes a platen, a radiation emission module, an image capture device and/or other components. The platen may be configured to engage the friction ridge pattern of the subject. The radiation emission module may be configured to provide radiation to the platen at or near the engagement between the platen and the friction ridge pattern. The radiation may be totally internally reflected at the platen, with the exception of the locations on the platen where the friction ridge pattern engages the platen, as total internal reflection may be frustrated at these locations. The image capture device may be configured to receive the radiation that is totally internally reflected at the platen and to electronically capture an image of the friction ridge pattern that is engaged with platen.

The system may further include one or more elements that block ambient light that enters the system before the ambient light reaches the image capture device. For example, the system may include a polarizer and an optical analyzer. The polarizer may include one or more optical elements configured to provide radiation that becomes incident thereon with a uniform polarization. This may include transmitting substantially only the radiation that becomes incident thereon with the uniform polarization while blocking (e.g., absorbing, reflecting, etc.) substantially all of the radiation that becomes incident thereon with a polarization other than the uniform polarization. The polarizer may be disposed within the system between the platen and the image capture device to receive substantially any radiation emanating (e.g. via reflection, transmission, etc.) from the platen. This may include both radiation emitted by the radiation emission module and ambient light that enters the system through the platen.

The optical analyzer may include one or more optical elements configured to transmit only radiation with a requisite polarization. The optical analyzer may be disposed within the system between the platen and the image capture device to shield the image capture device from substantially all of the radiation within the system that does not have the requisite polarization. The optical analyzer may be formed such that the requisite polarization is different than the uniform polarization that is imparted to radiation by the polarizer 32. This may effectively screen the image capture device from at least some of the ambient light that enters the system through the platen. For example, a beam of ambient light entering the system to become incident on the polarizer and then on the optical analyzer would be polarized by the polarizer and blocked from reaching the image capture device by the optical analyzer, as the polarization imparted to the beam of ambient light by the polarizer would be different than the requisite polarization.

In some embodiments, the system may include a polarization member and one or more beam folding members. The polarization member may be configured to change the polarization of radiation that becomes incident thereon. In some instances, the polarization member may change the polarization that becomes incident thereon from the uniform polarization provided to radiation by the polarizer to the requisite polarization that will be transmitted by the optical analyzer. This may enable some of the radiation that emanates from the platen (e.g., radiation provided by the radiation emission module) to pass through both the polarizer and the optical analyzer to become incident on image capture device. The folding members may be configured to define an optical path from the polarizer to the polarization member and on to the optical analyzer such that radiation that travels along the optical path defined by the folding members may be transmitted through the optical analyzer. For example, the folding members may be disposed within the system to guide radiation that is reflected from the platen at or near the engagement between the friction ridge pattern and the platen. This may ensure that the radiation from radiation emission module that is reflected from the platen to form an image of the friction ridge pattern on the platen will be transmitted through both the polarizer and the analyzer to reach the image capture device. Other members may also be implemented within the system to block ambient light.

One source of ambient light within the system that may be guided by the system to pass through to the image capture device includes a beam of ambient light that enters the system through the platen and becomes incident on the radiation emission module. The beam may be reflected by a reflector associated with the radiation emission module back toward the platen. This beam may then be totally internally reflected by the platen and proceed along a path similar to radiation emitted by the radiation emission module to become incident on the image capture device. In other words, the arrangement of the polarizer, the analyzer, and the polarization member may not be effective in blocking this beam of reflected ambient light because of the proximity (or even collocation) of the path of this beam with radiation emitted by the radiation emission module. Accordingly, in some embodiments, the radiation emission module may include components designed to prevent ambient light from entering the system through the platen, becoming incident on the reflector associated with the radiation emission module, and returning back toward the platen from substantially the same direction as radiation emitted by the radiation emission module.

For example, in some embodiments, the radiation emission module may include a source and a Total Internal Reflection mirror ("TIR mirror"). The source may emit radiation to be guided toward the platen. The TIR mirror may include a surface configured to guide radiation emitted from the source toward the platen by total internal reflection. In contrast, a beam of ambient light that enters the system via the platen may propagate to the TIR mirror with an angle of incidence to the TIR mirror that is less than the critical angle of the TIR mirror. Accordingly, the beam of ambient light may be transmitted through the TIR mirror without being totally internally reflected. By this mechanism, ambient light that would otherwise impact the performance of the system may be dumped from the system through the TIR mirror.

In some other embodiments, the radiation emission module may include a source, a linear polarizer, and a quarter-wave retarder, with the polarizer and the quarter-wave retarder being disposed between the platen and the source. The linear polarizer may provide a linear polarization to radiation that becomes incident thereon. The quarter-wave retarder may change the polarization of radiation that becomes incident thereon. For example, the quarter-wave retarder may change linearly polarized radiation to circularly polarized radiation, and vice versa.

The arrangement of the linear polarizer and the quarter-wave retarder in the radiation emission module may reduce the impact of ambient light that enters the system through the platen and is reflected from the source back to the platen. For example, as a beam of ambient light enters the system through the platen and proceeds toward the source, the beam of ambient may become incident on the linear polarizer, which linearly polarizes the ambient light in a first orientation. The linearly polarized ambient light may then become incident on the quarter-wave retarder, which alters the polarization state of ambient light to make the ambient light circularly polarized. After being reflected by the source, the ambient light may then again become incident on the quarter-wave retarder, which may again change the polarization state of the ambient light to linear. However, the orientation of the polarization of ambient light after passing through the quarter-wave retarder a second time may be orthogonal to the orientation of linear polarization provided to the ambient light by the linear polarizer. Thus, as the ambient light becomes incident again on the linear polarizer, the polarization of the ambient light may be orthogonal to the polarization of the linear polarizer, which may thereby block ambient light by virtue of this orthogonality.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
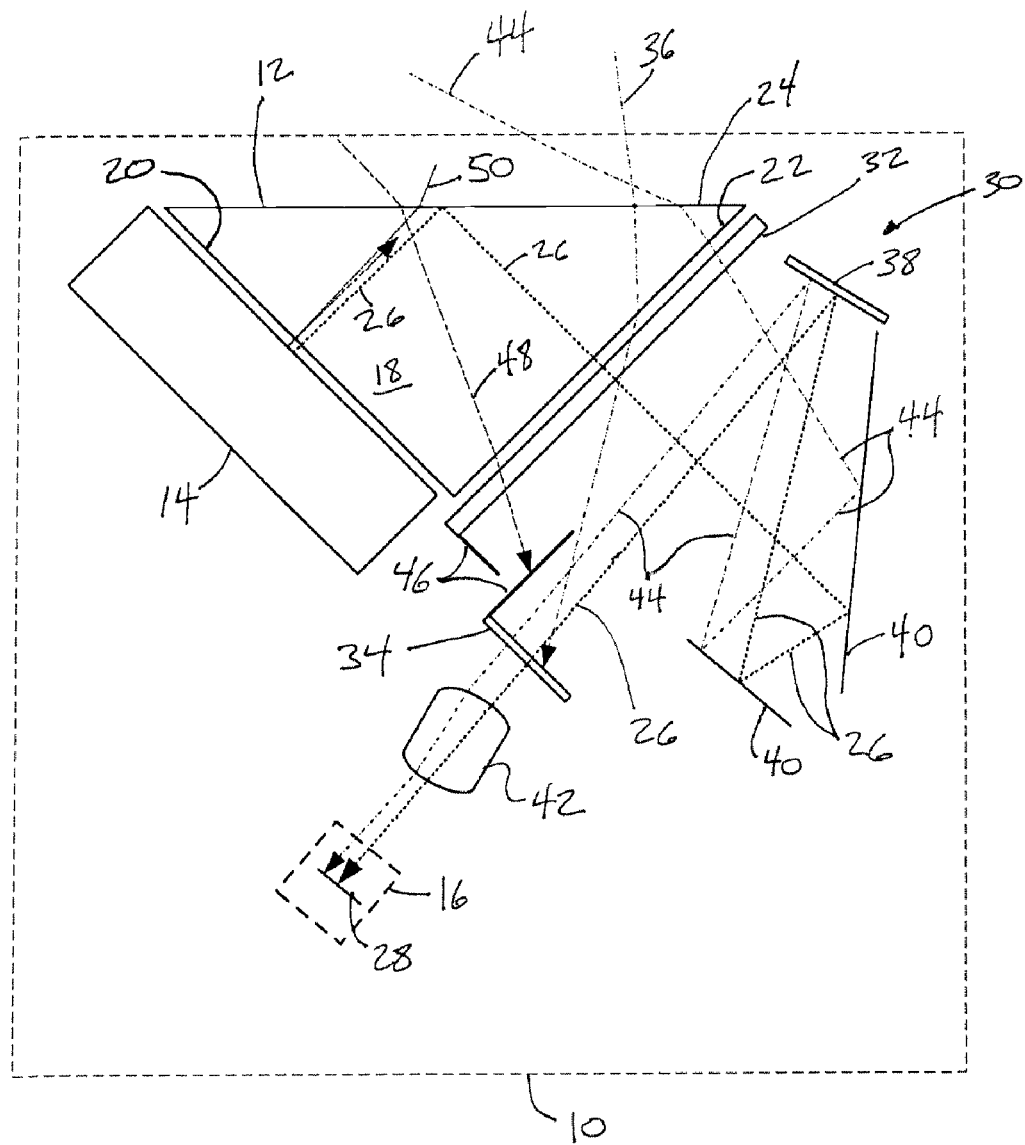
FIG. 1 illustrates a fingerprint imaging system, in accordance with one or more embodiments of the invention.

FIG. 1 illustrates a fingerprint imaging system 10, in accordance with one or more embodiments of the invention. System 10 may be configured to capture an image of a friction ridge pattern of a subject (e.g., a fingerprint, a palm print, a hand print, a footprint, etc.). System 10 may include one or more components that reduce the impact of ambient light on system 10. As is discussed further below, system 10 may reduce the impact of ambient light without requiring additional power (e.g., to generate an increased amount of radiation) or including "external" hoods and/or covers designed to block ambient light prior to the ambient light entering system 10. In some embodiments, system 10 includes a platen 12, a radiation emission module 14, an image capture device 16 and/or other components.

Platen 12 may be configured to engage the friction ridge pattern of the subject. In some embodiments, platen 12 may be provided by a prism 18. Prism 18 may be formed such that radiation is guided to platen 12 internally from within prism 18. For example, prism 18 may include a light reception surface 20 through which radiation may be received into prism 18. Radiation received into prism 18 at light reception surface may become incident on platen 12 from within prism 18. This radiation may be totally internally reflected by platen 12 to be directed towards a light exit surface 22, from which the reflected radiation exits prism 18. Although in FIG. 1 platen 12 is shown as being located at an external surface 24 of prism 18, it should be appreciated that one or more coatings may be applied to external surface 24. In these instances, platen 12 may be formed at the external surface of the outermost coating. Examples of coatings that may be applied to external surface 24 may include silicon oxide, quartz, and/or other coatings.

Figure 2:
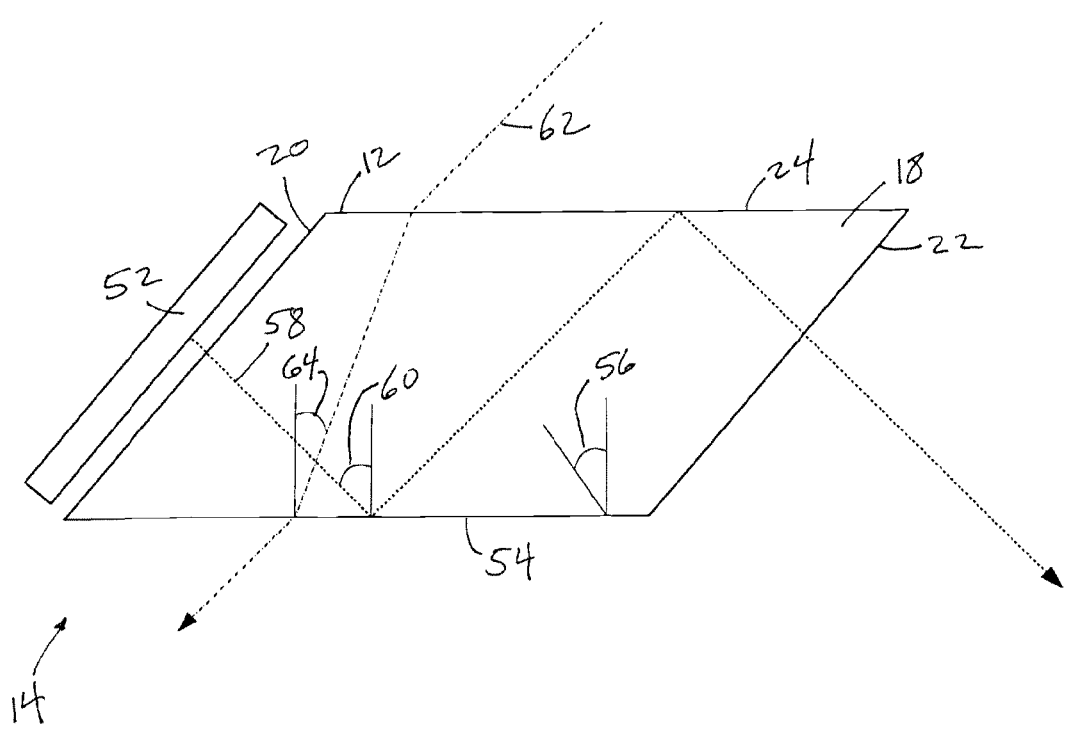
FIG. 2 illustrates a radiation emission module for use in a fingerprint imaging system, according to one or more embodiments of the invention.
Figure 3:
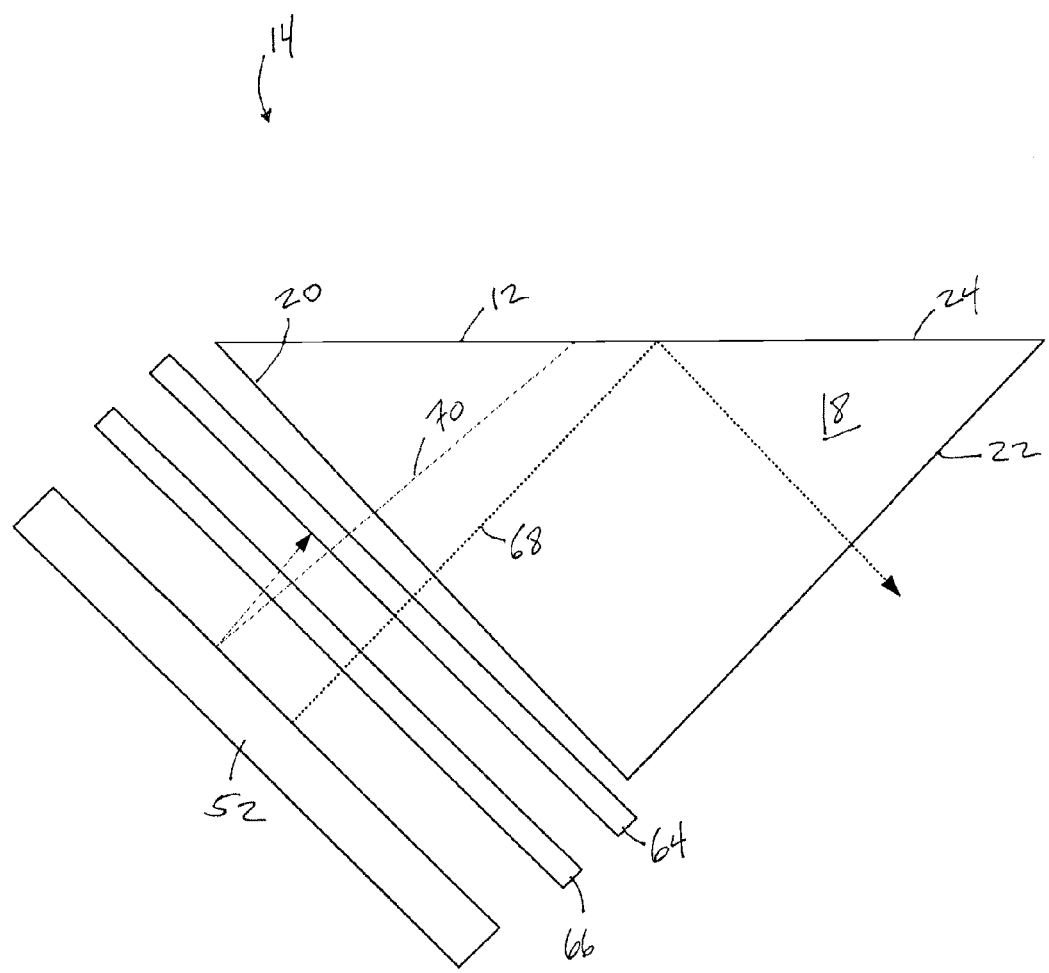
FIG. 3 illustrates a radiation emission module for use in a fingerprint imaging system, in accordance with one or more embodiments of the invention.

Radiation emission module 14 may be configured to provide radiation to system 10. As is shown in FIG. 1, radiation 26 provided by radiation emission module 14 may be directed to platen 12. For example, radiation emission module 14 may be arranged within system 10 such that radiation 26 is emitted by radiation emission module 14 towards light reception surface 20 of prism 18 to be directed to platen 12 and totally internally reflected at platen 12 toward light exit surface 22. Radiation emission module 14 may include one or more emitters that emit radiation that is directed toward platen 12. The one or more emitters may include one or more of Organic Light Emitting Diodes ("OLEDs"), lasers (e.g., diode lasers or other laser emitters), Light Emitting Diodes ("LEDs"), Hot Cathode Fluorescent Lamps ("HCFLs"), Cold Cathode Fluorescent Lamps ("CCFLs") incandescent lamps, halogen bulbs, received ambient light, and/or other electromagnetic radiation emitters. Radiation emission module 14 may include a reflector that directs the radiation emitted from the one or more emitters toward platen 12. The reflector may include a mirrored surface formed to directionally guide the emitted radiation in a substantially collimated beam, or the reflector may include another reflective surface that diffuses and guides the radiation (e.g., a white surface). As was mentioned above, at least a portion of the radiation provided to platen 12 by radiation emission module 14 may become incident upon platen 12 at an angle of incidence such that the radiation is totally internally reflected at platen 12 except at locations where the total internal reflection is frustrated by contact between the friction ridge pattern and platen 12. In some implementations (e.g., as shown in FIGS. 2 and 3 and discussed further below), radiation emission module 14 may include components designed to prevent ambient light from entering system 10 through platen 12, becoming incident on the reflector of radiation emission module 14, and returning back toward platen 12 from substantially the same direction as radiation emitted by the emitters of radiation emission module 14.

Image capture device 16 may be configured to electronically capture an image of the friction ridge pattern that is engaged with platen 12. Image capture device 16 may include, for example, an imaging chip 28 configured to generate one or more output signals from which an image formed on imaging chip 28 may be recreated. For instance, image capture device 16 may include one or more CCD chips, one or more CMOS chips, and/or other imaging chips. Image capture device 16 may be arranged within system 10 at an image plane on which an image of platen 12 is formed.

In some embodiments, system 10 may include image forming optics 30. Image forming optics 30 may include one or more optical elements configured to, among other things, form an image of platen 12 on image capture device 16. Image forming optics 30 may include one or more optical elements designed to reduce the impact of ambient light on the performance of system 10. These components may reduce the impact of ambient light by, for instance, reducing the amount of ambient light that reaches image capture device 16. For example, image forming optics may include a polarizer 32 and an optical analyzer 34.

Polarizer 32 may include one or more optical elements configured to provide radiation that becomes incident thereon with a uniform polarization. This may include transmitting substantially only the radiation that becomes incident thereon with the uniform polarization while blocking (e.g., absorbing, reflecting, etc.) substantially all of the radiation that becomes incident thereon with a polarization other than the uniform polarization. Polarizer 32 may be disposed within system 10 between platen 12 and image capture device 16 to receive substantially any radiation emanating (e.g. via reflection, transmission, etc.) from platen 12 toward image capture device 16. In the implementation illustrated in FIG. 1, polarizer 32 may be disposed to receive substantially all of the radiation that exits prism 18 from light exit surface 22. In some embodiments, polarizer 32 may be formed as a separate optical element. In some other embodiments, polarizer 32 may be formed as a polarizing film that is disposed onto another optical element. For instance, polarizer 32 may be formed as a polarizing film that is disposed on light exit surface 22 of prism 18. As another example, polarizer 32 may be formed as a coating on external surface 24 of prism 18. As yet another example, polarizer 32 may be formed as an optical member that is external to platen 12 (e.g., as a hood including polarizer 32).

Optical analyzer 34 may include one or more optical elements configured to transmit only radiation with a requisite polarization. Optical analyzer 34 may be disposed within system 10 between platen 12 and image capture device 16 to shield image capture device 16 from substantially all of the radiation within system 10 that does not have the requisite polarization. Optical analyzer 34 may be formed such that the requisite polarization is different than the uniform polarization that is imparted to radiation by polarizer 32. This may effectively screen image capture device 16 from at least some of the ambient light that enters system 10 through external surface 24 of prism 18. For example, a beam of ambient light 36 entering prism 18 via external surface 24 and exiting prism 18 at light exit surface 22 to become incident on polarizer 32 and then optical analyzer 34 would be polarized by polarizer 32 and blocked from reaching image capture device 16 by optical analyzer 34, as the polarization imparted to beam 36 by polarizer 32 would be different than the requisite polarization. Optical analyzer 34 may be formed as a separate optical element. In some other instances, optical analyzer 34 may be formed as a film that is disposed on another optical element (e.g., imaging lens 42 discussed below).

In some embodiments, image forming optics 30 may include a polarization member 38 and one or more beam folding members 40. Polarization member 38 may be configured to change the polarization of radiation that becomes incident thereon. In some instances, polarization member 38 may change the polarization that becomes incident thereon from the uniform polarization provided to radiation by polarizer 32 to the requisite polarization that will be transmitted by optical analyzer 34. This may enable some of the radiation that emanates from platen 12 (e.g., beam 26) to pass through both polarizer 32 and optical analyzer 34 to become incident on image capture device 16. For example, in some embodiments, polarizer 32 imparts a linear polarization to radiation that is transmitted therethrough while optical analyzer 34 transmits only radiation with a linear polarization having an orientation that is orthogonal to the linear polarization imparted to radiation by polarizer 32. In such embodiments, polarization member 38 may include a quarter-wave retarder (e.g., a quarter-wave plate, a quarter-wave film, etc.) and a reflective surface (e.g., a mirror), with the quarter-wave retarder being disposed at or near a reflective surface, such that the orientation of linearly polarized radiation is shifted by polarization member 38 by 90°.

As is shown in FIG. 1, folding members 40 may be configured to define an optical path from polarizer 32 to polarization member 38 and on to optical analyzer 34 such that radiation that travels along the optical path defined by folding members 40 (e.g., beam 26) may be transmitted through optical analyzer 34. Folding members 40 may be disposed within system 10 to guide radiation that emanates from platen 12 along a path similar to radiation 26 that is emitted by radiation emission module 14 and reflected at platen 12. This may ensure that radiation 26 from radiation emission module 14 that forms an image of the friction ridge pattern on platen 12 will be transmitted through both polarizer 32 and analyzer 34 to reach image capture device 16. Folding members 40 may include one or more mirrored surfaces that reflect radiation. In some other instances, folding members 40 may include one or more other optical elements capable of bending or folding an optical path of radiation.

In some embodiments, image forming optics 30 may include an imaging lens 42. Imaging lens 42 may be disposed within system 10 to form an image of platen 12 on image capture device 16. Imaging lens 42 may be decentered and tilted with respect to the optical path defined by image forming optics 30. This may focus ambient light traveling on a path similar to the optical path defined by image forming optics 30 onto locations of image capture device 16 that are spatially separated from the image of the engagement between the friction ridge pattern and platen 12. For example, in some instances, a beam of ambient light 44 may enter system 10 via platen 12 along an optical path similar to the optical path of radiation 26 reflected by platen 12 near the engagement between the friction ridge pattern and platen 12. As may be appreciated from FIG. 1, because of the similarity between the path of beam 44 and the optical path of radiation 26, beam 44 may be transmitted through both polarizer 32 and analyzer 34 and become incident on image capture device 16. However, if imaging lens 42 is tilted and decentered, beam 44 may be guided by lens 42 to a location on imaging capture device 16 that is spatially apart from the image that is formed of the friction ridge pattern.

It should be appreciated that in some instances imaging lens 42 may be neither tilted nor decentered (as these may impact the aspect of the image). Further, various properties of other components of system 10 may be designed to reduce the amount of ambient light that is guided by image forming optics 30 such that it is transmitted by both polarizer 32 and analyzer 34. For example, polarization member 38 and/or folding members 40 may be configured to reduce the amount of ambient light that is inadvertently guided from polarizer 32 to analyzer by way of polarization member 38 (e.g., by virtue of their size, orientation, etc.). In some instances, one or more baffles 46 may be provided within system 10. Baffles 46 may be configured to block ambient light (e.g., a beam of ambient light 48) within system 10.

As was mentioned above, one source of ambient light includes a beam of ambient light 50 that enters system 10 through platen 12 and becomes incident on radiation emission module 14. Beam 50 may be reflected by a reflector associated with radiation emission module 14 back toward platen 12. As should be appreciated from FIG. 1, beam 50 may then be reflected by platen 12 and proceed along a path similar to radiation 26 to become incident on image capture device 16. In other words, the arrangement of polarizer 32, analyzer 34, and polarization member 38 may not be effective in blocking beam 50 because of the proximity (or even collocation) of the path of beam 50 with radiation 26 emitted by radiation emission module 14. Accordingly, in some embodiments, radiation emission module 14 may include components designed to prevent ambient light from entering system 10 through platen 12, becoming incident on the reflector associated with radiation emission module 14, and returning back toward platen 12 from substantially the same direction as radiation emitted by the emitters of radiation emission module 14.

For example, FIG. 2 illustrates radiation emission module 14, according to one or more embodiments. Radiation emission module 14, as shown in FIG. 2, is designed to reduce the impact of ambient light that is reflected from radiation emission module 14 back toward platen 12 (e.g., beam 50 shown in FIG. 1 and described above). Radiation emission module 14 may include a source 52 and a TIR mirror 54. Source 52 may include the emitter that emits radiation and the reflector that guides the radiation emitted by emitter toward platen 12, as was discussed above. TIR mirror 54 may include a surface configured to guide radiation emitted from source 52 toward platen 12 by total internal reflection. In the implementation shown in FIG. 2, TIR mirror 54 is formed by a boundary of prism 18, but this is not intended to be limiting. In other implementations a waveguide separate from prism 18 may be used to form TIR mirror 54.

TIR mirror 54 is formed such that if radiation becomes incident thereon at an angle of incidence less than a critical angle 56 of TIR mirror 54, then the radiation will pass through TIR mirror 54. If radiation becomes incident upon TIR mirror 54 at an angle of incidence greater than critical angle 56, then the radiation will be reflected by the optical phenomenon of total internal reflection by TIR mirror 54. It should be appreciated that critical angle 56 is a function of the indices of refraction of the two optical media that come together at TIR mirror 54 (e.g., prism 18 and air).

Source 52 may be arranged within system 10 such that radiation 58 emitted from source 52 that enters prism 18 via light reception surface 20 becomes incident on TIR mirror 54 at an angle of incidence 60 that is greater than critical angle 56. Accordingly, substantially all of the radiation emitted by source 52 into prism 18 will be reflected at TIR mirror 54 to become incident on platen 12. In contrast, the amount of ambient light that is guided through prism 18 and into source 52 may be reduced. For example, a beam of ambient light 62 may enter prism 18 via external surface 24 and propagate to TIR mirror 54 with an angle of incidence 64 to TIR mirror that is less than critical angle 56. Beam 62 may be transmitted through TIR mirror 54 without being totally internally reflected. By this mechanism, ambient light that would otherwise impact the performance of system 10 may be dumped from system 10 through TIR mirror 54.

FIG. 3 illustrates another example of radiation emission module 14, in accordance with one or more embodiments. In the implementation shown in FIG. 3, radiation emission module 14 may include source 52, a linear polarizer 64, and a quarter-wave retarder 66. Linear polarizer 64 provides a linear polarization to radiation that becomes incident thereon. Linear polarizer 64 may be formed as a distinct optical element, or linear polarizer 64 may include a linear polarizer film that is disposed on another optical element within system 10 (e.g., light reception surface 20 of prism 18). In some embodiments, polarizer 32 (shown in FIG. 1 and described above) includes a linear polarizer, and the orientation of the polarization imparted to radiation by linear polarizer 64 corresponds to the orientation of the polarization imparted to radiation by polarizer 32. Thus, radiation 68 emitted by source 52 that passes through linear polarizer 64 may also pass through polarizer 32 after being reflected by platen 12.

Quarter-wave retarder 66 changes the polarization of radiation that becomes incident thereon. For example, quarter-wave retarder 66 may change linearly polarized radiation to circularly polarized radiation, and vice versa. Quarter-wave retarder 66 may be formed as a separate optical element (e.g., a wave plate), or quarter-wave retarder 66 may include a quarter-wave film disposed on another optical element (e.g., the reflector of source 52, linear polarizer 64, etc.).

The arrangement of linear polarizer 64 and quarter-wave retarder 66 may reduce the impact of ambient light that enters system 10 through platen 12 and is reflected from source 52. For example, as a beam of ambient light 70 enters system 10 through platen 12 and proceeds toward source 52, beam 70 may become incident on linear polarizer 64 and may thereby become linearly polarized in a first orientation. The linearly polarized light of beam 70 may then become incident on quarter-wave retarder 66, which may alter the polarization state of beam 70 to make the light of beam 70 circularly polarized. After being reflected at source 52, beam 70 may again become incident on quarter-wave retarder 66, which may again change the polarization state of light in beam 70 to linear. However, the orientation of the polarization of beam 70 after passing through quarter-wave retarder 66 a second time may be orthogonal to the orientation of linear polarization provided to radiation by linear polarizer 64. Thus, as beam 70 becomes incident again on linear polarizer 64, the polarization of the light of beam 70 may be orthogonal to the polarization of linear polarizer 64, which may thereby block beam 70 by virtue of this orthogonality.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it should be understood that the present invention contemplates that, to the extent possible, one or more features of any embodiment can be combined with one or more features of any other embodiment.

What is claimed is:

1. A fingerprint imaging system configured to capture an image of a friction ridge pattern of a subject, the system comprising:
    a platen configured to be engaged by the friction ridge pattern of the subject;
    an image capture device configured to electronically capture an image of the friction ridge pattern engaged with the platen; and
    a radiation emission module configured to provide radiation to the platen, the radiation emission module comprising:
        a source configured to emit radiation that is directed towards the platen;
        a linear polarizer disposed between the source and the platen; and
        a quarter-wave retarder disposed between the source and the platen.

2. The system of claim 1, wherein the source comprises a backlighting unit configured to emit radiation toward the platen.

3. The system of claim 1, wherein quarter-wave retarder comprises a retarder film, and wherein the linear polarizer comprises a linear polarizer film that is backed with the retarder film.

4. The system of claim 1, wherein the radiation emission module and the platen are configured such that at least a portion of the radiation provided by the radiation emission module is reflected by the platen at or near the engagement between the friction ridge pattern and the platen and forms the image of the friction ridge pattern to be captured by the image capture device.

5. The system of claim 4, further comprising an optical analyzer configured to block radiation that becomes incident thereon unless the incident radiation has a requisite polarization, the optical analyzer being disposed within the system to shield the image capture device from receiving radiation that does not have the requisite polarization, whereby the optical analyzer blocks ambient light without the requisite polarization that enters the system via the platen and would otherwise become incident on the image capture device.

6. The system of claim 1, wherein the quarter-wave retarder is disposed on a reflector associated with the source.

7. The system of claim 1, wherein polarizer is disposed between the quarter-wave retarder and the platen.

8. A fingerprint imaging system configured to capture an image of a friction ridge pattern of a subject, the system comprising:
    a platen configured to be engaged by the friction ridge pattern of the subject;
    an image capture device configured to electronically capture an image of the friction ridge pattern engaged with the platen; and
    a radiation emission module configured to provide radiation to the platen, the radiation emission module comprising:
        a source configured to emit radiation that is directed towards the platen; and
        a TIR mirror configured to guide radiation from the source to the platen by total internal reflection.

9. The system of claim 8, further comprising a prism that forms the platen and the TIR mirror.

10. The system of claim 8, wherein the source comprises a backlighting unit configured to emit radiation toward the platen.

11. The system of claim 8, wherein the radiation emission module and the platen are configured such that at least a portion of the radiation provided by the radiation emission module is reflected by the platen at or near the engagement between the friction ridge pattern and the platen and forms the image of the friction ridge pattern to be captured by the image capture device.

12. The system of claim 11, further comprising an optical analyzer configured to block radiation that becomes incident thereon unless the incident radiation has a requisite polarization, the optical analyzer being disposed within the system to shield the image capture device from receiving radiation that does not have the requisite polarization, whereby the optical analyzer blocks ambient light without the requisite polarization that enters the system via the platen and would otherwise become incident on the image capture device.

* * * * *